Feb. 8, 1944.   A. H. HABERSTUMP   2,341,093
SINK CABINET
Filed Nov. 28, 1939   7 Sheets-Sheet 1

INVENTOR
Alfred H. Haberstump.
BY Harness, Dickey & Pierce.
ATTORNEYS.

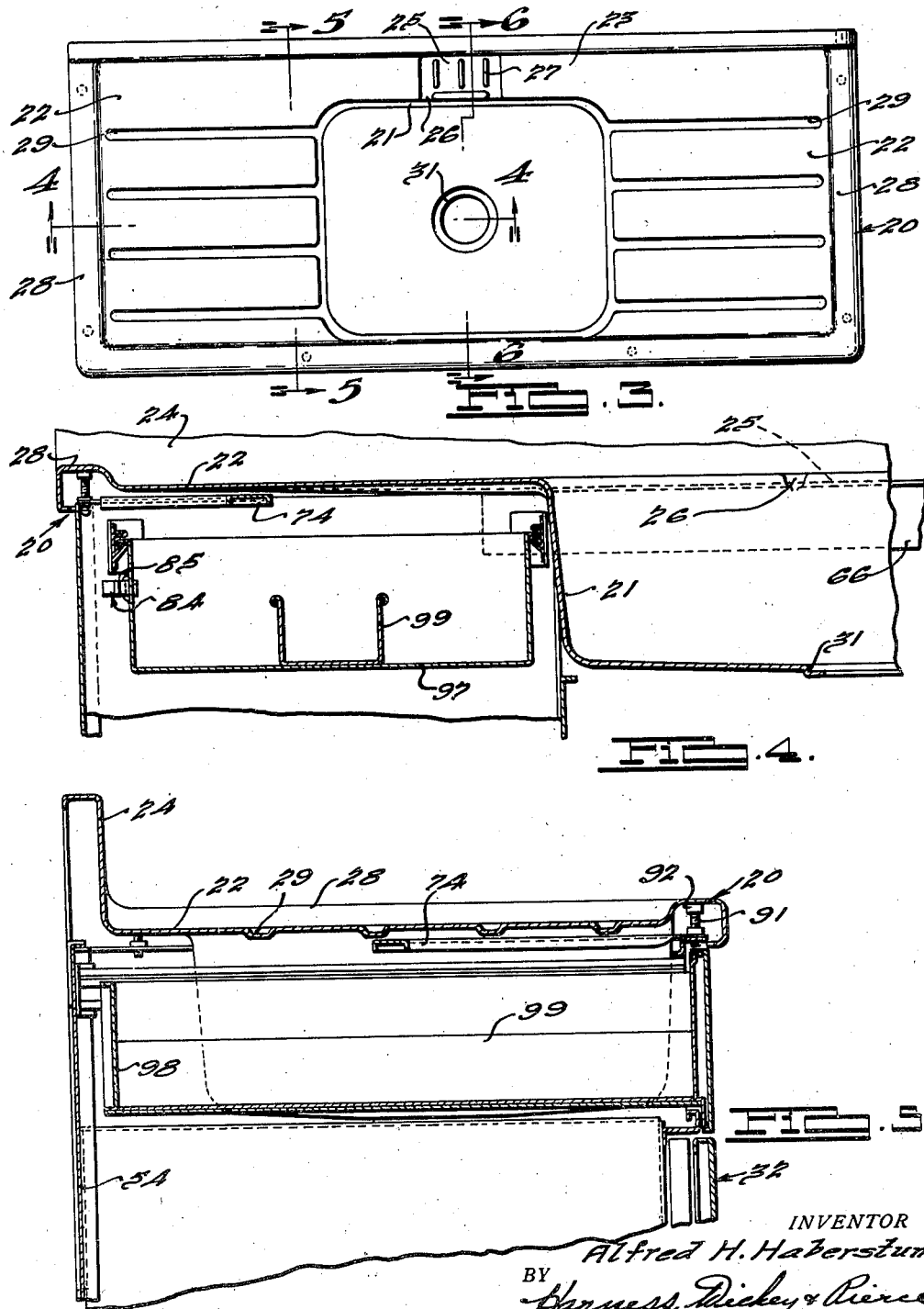

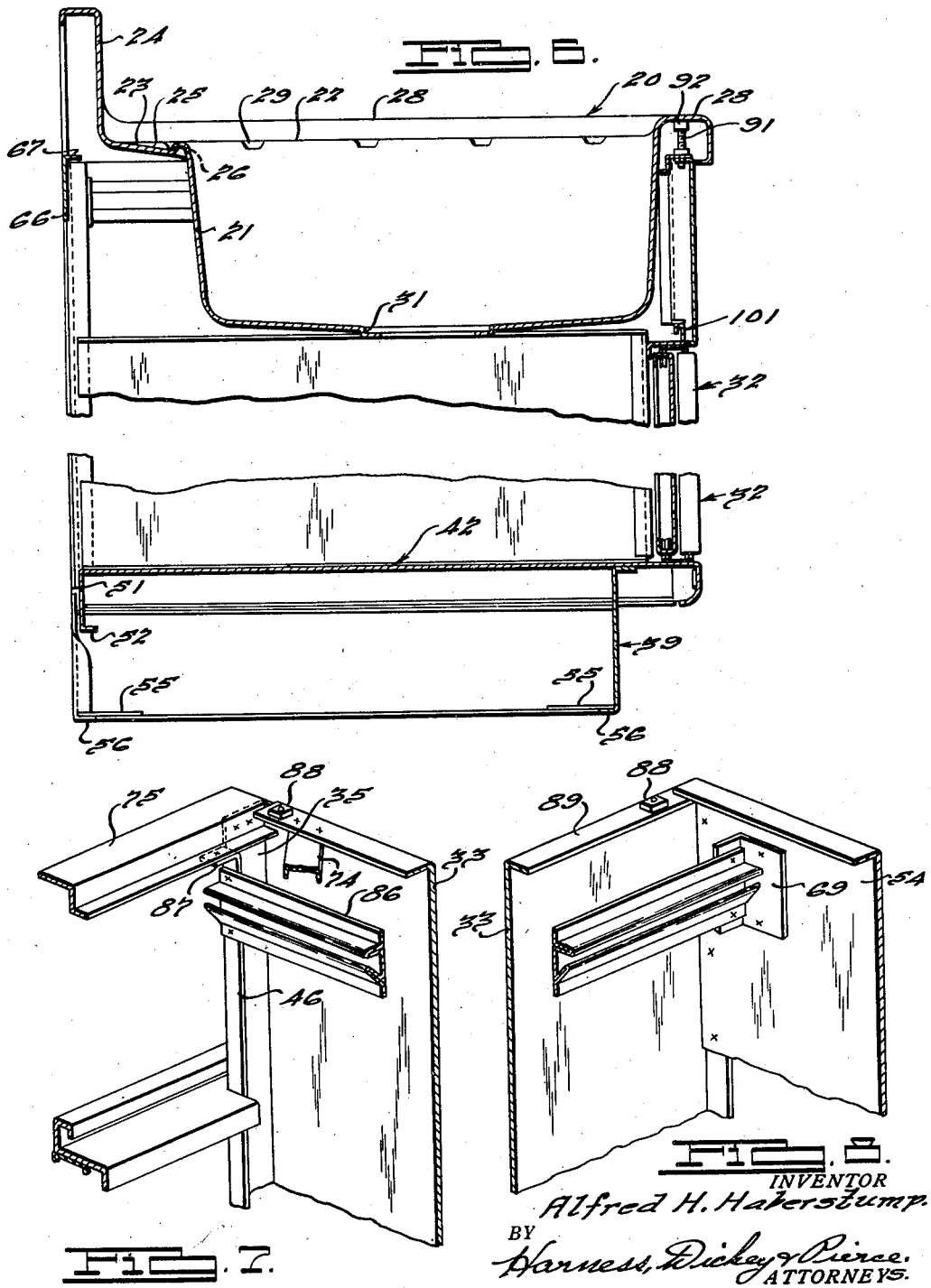

Feb. 8, 1944.  A. H. HABERSTUMP  2,341,093
SINK CABINET
Filed Nov. 28, 1939   7 Sheets-Sheet 4
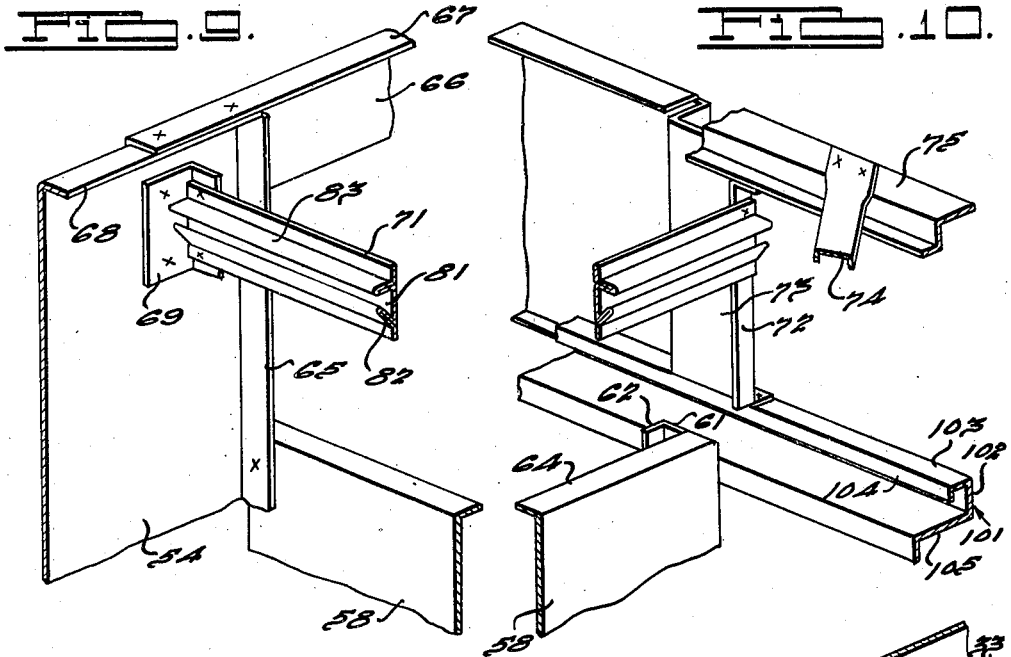
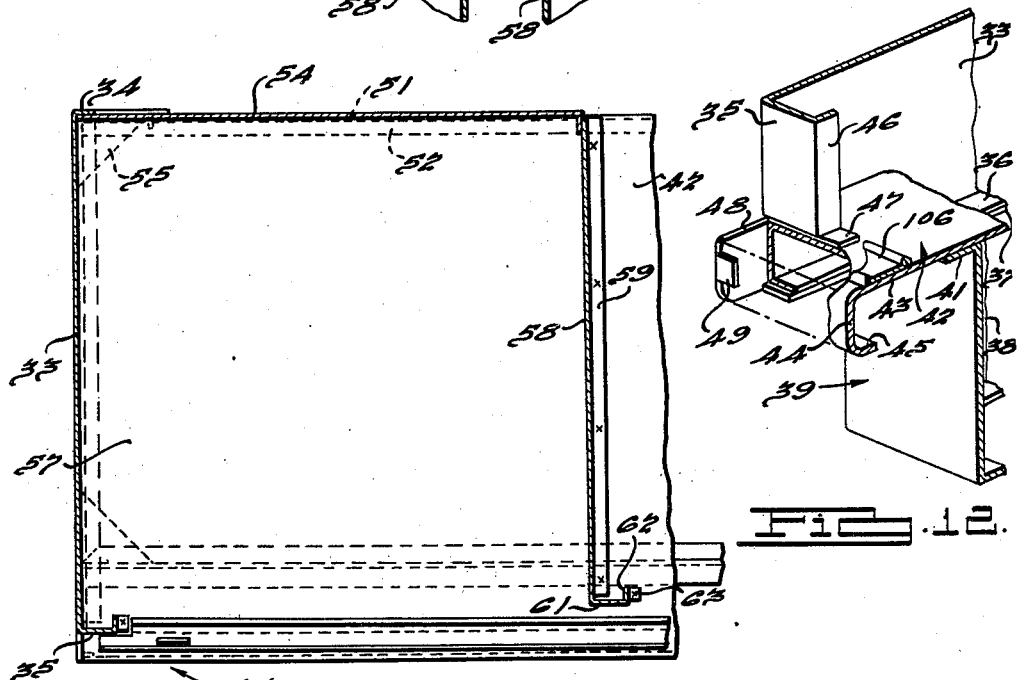
INVENTOR
Alfred H. Haberstump.
BY
Harness, Dickey & Pierce
ATTORNEYS.

Feb. 8, 1944. A. H. HABERSTUMP 2,341,093
SINK CABINET
Filed Nov. 28, 1939 7 Sheets-Sheet 5
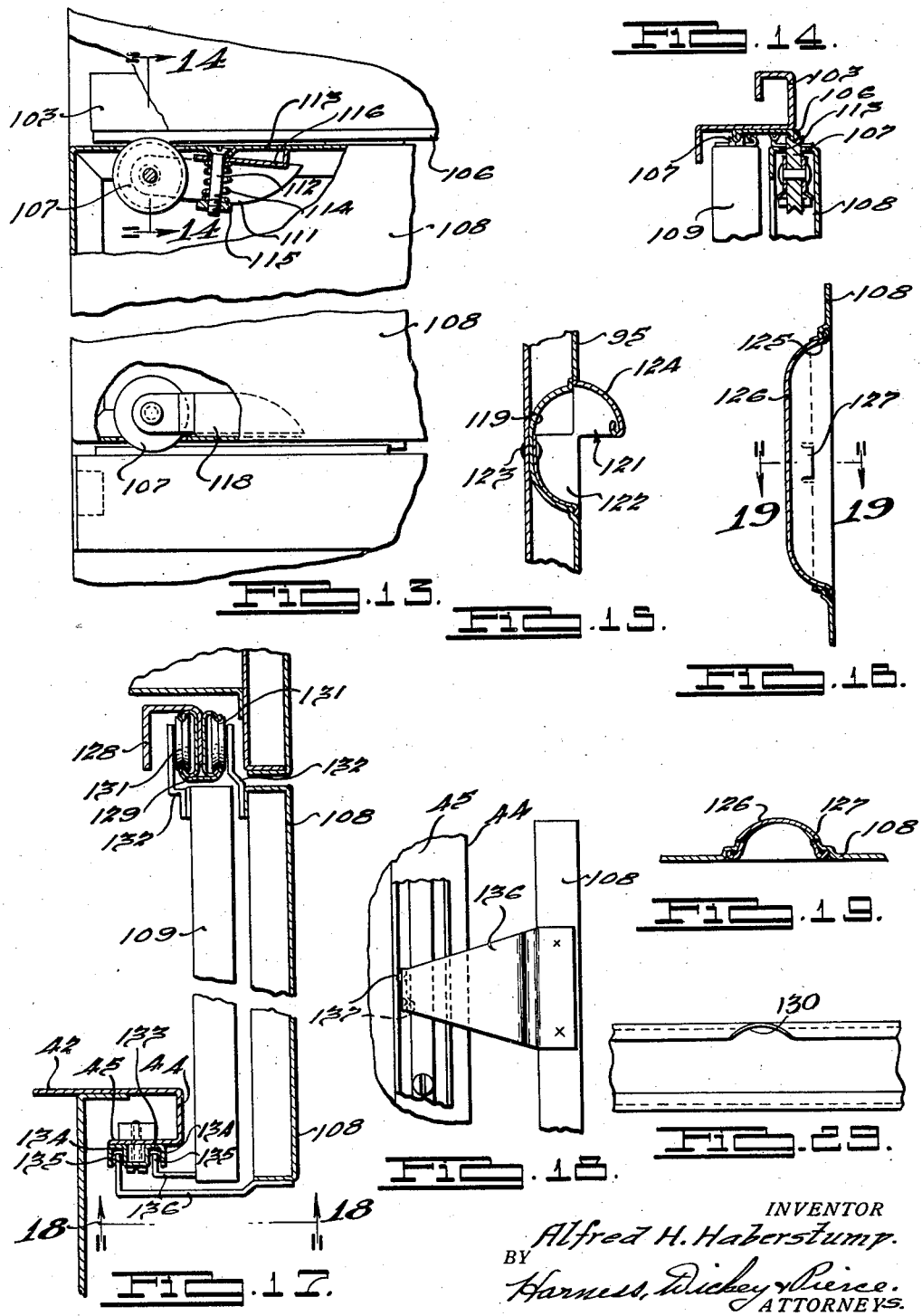

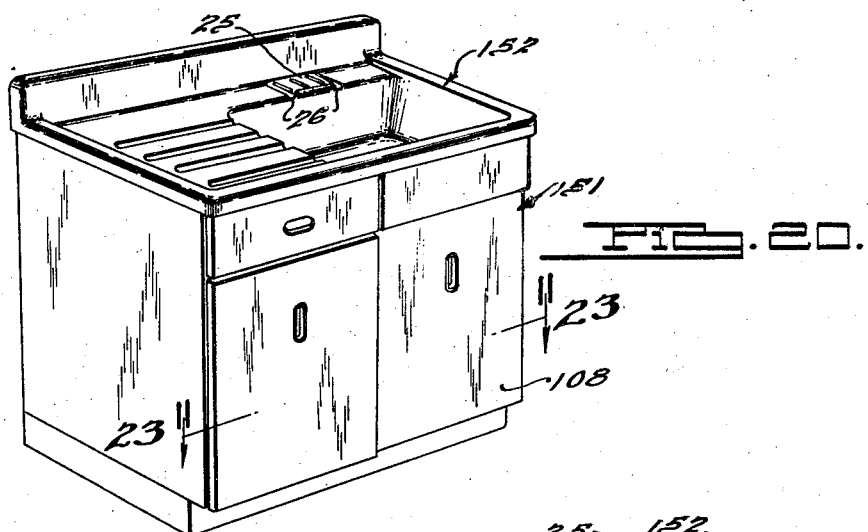
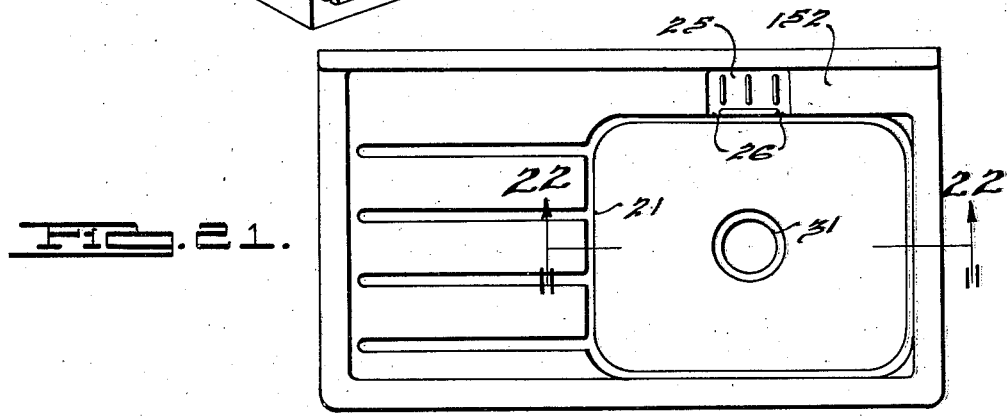
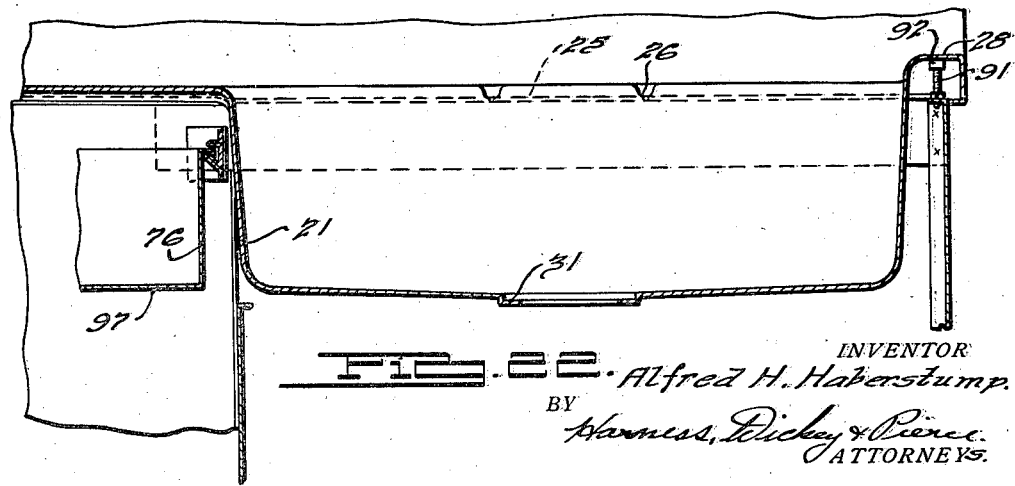

Feb. 8, 1944.  A. H. HABERSTUMP  2,341,093
SINK CABINET
Filed Nov. 28, 1939  7 Sheets-Sheet 7
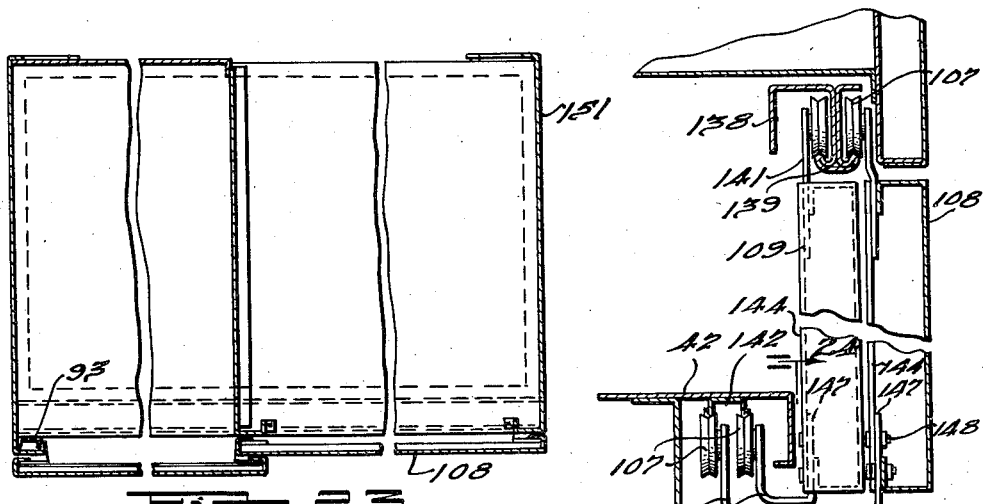
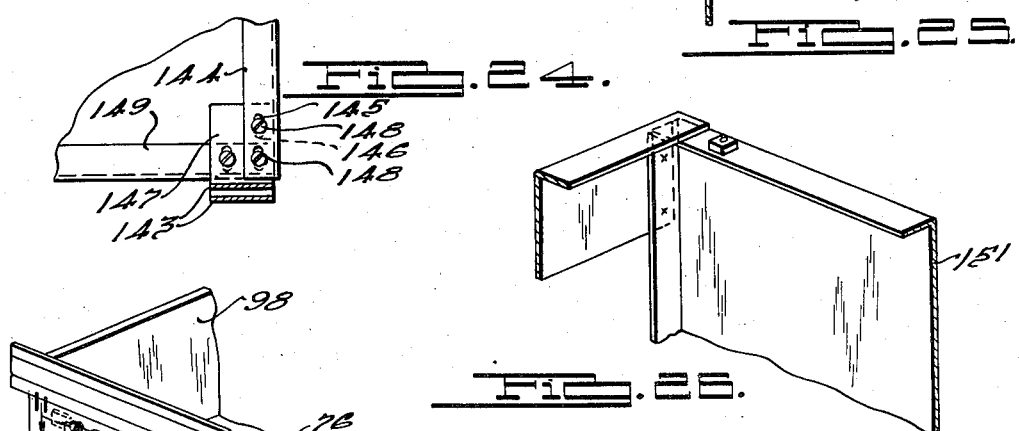
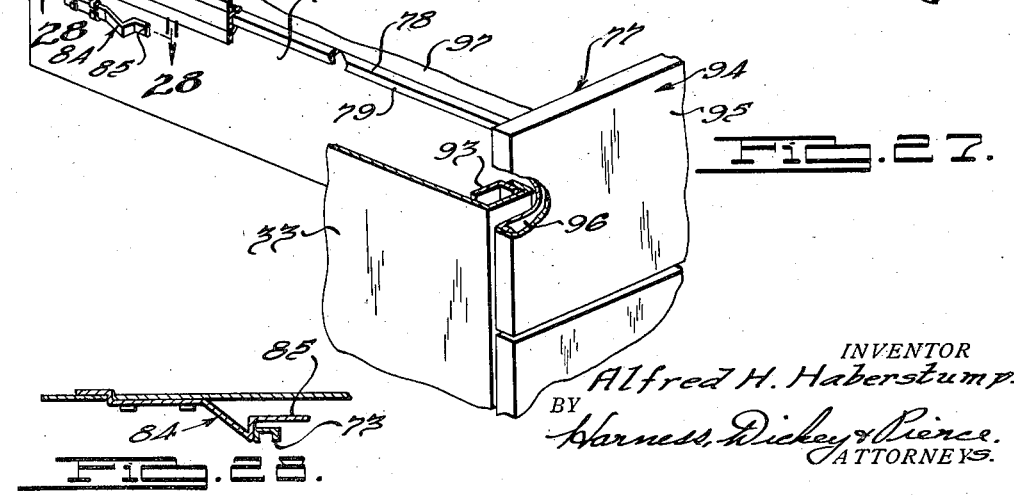
INVENTOR
Alfred H. Haberstump.
BY Harness, Dickey & Pierce.
ATTORNEYS.

Patented Feb. 8, 1944

2,341,093

UNITED STATES PATENT OFFICE 2,341,093

SINK CABINET

Alfred H. Haberstump, Detroit, Mich., assignor to The Murray Corporation of America, Detroit, Mich., a corporation of Delaware Application November 28, 1939, Serial No. 306,546

10 Claims. (Cl. 312—141)

My invention relates to sinks and cabinets, and particularly to a cabinet and sink of sheet metal construction in which the cabinet forms a support for the sink and the associated drainboards and provides drawers and compartments for storage.

While sinks and cabinets of the sheet metal type have been constructed heretofore in the art, the present invention embodies new and novel structure and methods for producing such assemblies. The cabinet is formed of a pair of end walls secured together by suitable framing elements upon a base over which the front of the cabinet overhangs. Offset doors enclose the front of the cabinet when supported on suitable ways by rollers which permit the movement of one door in overlapping relation with the other. Between the top of the doors and the top of the cabinet, drawers may be provided which are suspended on trackways of simple unique construction.

The sink and drainboards along with the splashboard and the marginal edge is formed from a unit sheet of metal in a minimum number of die and bending operations. The marginal edge of the sink at the sides and front extends upwardly above the drainboard and the back ledge between the sink basin and the splashboard, the latter of which projects upwardly above the marginal edge. The drainboard is preferably flat, having channels debossed therein which slope toward the basin. The flat surface of the drainboard supports dishes, pans, and other utensils, and the water draining therefrom is collected into the sloping channels and drained into the basin.

The sink is supported on a plurality of bolts projecting upwardly from the front and side walls of the cabinet, engaging the underside of the marginal top flange about the front and side edges of the sink. Rubber caps are preferably provided on the heads of the bolts to insulate the sink and cabinet against the conduction of sound. Three cross bars are utilized for interconnecting the front ends of the side panels, the lower and intermediate pair carrying suitable rail elements which are engaged by the door rollers. The doors covering the openings are metal panels having projecting arms on which the rollers are pivoted, adjacent doors being so mounted as to operate in different planes so as to be movable in overlapping relation to each other.

The bottom rail is extended to form the floor of the cabinet, supported on a base made of Z-section, which at the front extends inwardly of the front plane of the cabinet. The back of the cabinet is interconnected at the top by an angle member to which the rear end of the runways for the drawers are secured, the front ends being attached to the front panels below the top rail. The drawers have projecting flanges at the tops which engage the trackways and are supported thereby. Channel shaped cross braces may be secured between the front and back top rails to provide additional strength thereto.

Accordingly, the main objects of my invention are: to provide a sink having a basin and drainboard about the edge of which a marginal rolled flange is provided extending thereabove and terminating at the rear in a splashboard; to provide a drainboard and a ledge at the side and back of a sink disposed in a plane surface having channels formed therein tapering toward the sink basin; to provide a ledge between the basin of a sink and the splashboard at the back, with indented soap dish portions having a drain opening into the sink basin; to support the sink on a cabinet on a plurality of bolts which are adjustably mounted on the cabinet edges; to form a cabinet for a sink from side walls interconnected at the front by rail elements, the bottom one of which is extended to form a floor for the cabinet; to interconnect the central and lower rail of the cabinet with doors mounted on rollers and movable in different planes across the front of the cabinet; to provide drawer supporting channel rails between the front and the back of the cabinet in which outwardly projecting top flanges on the drawer project; to support the cabinet on a base formed of sheet metal of angular construction, which is welded or otherwise secured to flanges of the side panels and the floor of the cabinet inwardly of its front edge; and in general, to provide a cabinet made of sheet metal and a sheet metal sink supported thereon which is rugged in construction and economical of manufacture.

Other objects and features of novelty of my invention will be either specifically pointed out or will become apparent when referring, for a better understanding of my invention, to the following description taken in conjunction with the accompanying drawings, wherein:

Fig. 3 is a top plan view of the structure illustrated in Fig. 2;

Fig. 4 is an enlarged broken sectional view of structure illustrated in Fig. 3, taken on the line 4—4 thereof;

Fig. 5 is an enlarged broken sectional view of the structure illustrated in Fig. 3, taken on the line 5—5 thereof;

Fig. 6 is an an enlarged broken sectional view of the structure illustrated in Fig. 3, taken on the line 6—6 thereof;

Fig. 7 is an enlarged broken sectional view of the cabinet illustrated in Fig. 2, showing the inside left-hand corner thereof;

Fig. 8 is an enlarged broken sectional view of the cabinet illustrated in Fig. 2, showing the rear left-hand corner thereof;

Fig. 9 is an enlarged broken sectional view of the cabinet illustrated in Fig. 2, showing the right-hand trackway of the left-hand drawer at the rear of the cabinet;

Fig. 10 is an enlarged broken sectional view of the cabinet illustrated in Fig. 2, showing the right-hand trackway of the left-hand door at the front of the cabinet;

Fig. 11 is a broken sectional view of the structure illustrated in Fig. 2, taken on the line 11—11 thereof;

Fig. 12 is a broken sectional view of the corner of structure illustrated in Fig. 11, as viewed from the point 12 thereof;

Fig. 13 is a broken view, with parts in section, illustrating the rollers mounted on the doors shown in Fig. 6;

Fig. 14 is a sectional view of the structure illustrated in Fig. 13, taken on the line 14—14 thereof;

Fig. 15 is a broken sectional view of structure illustrated in Fig. 1, taken on the line 15—15 thereof;

Fig. 16 is an enlarged broken sectional view of the structure illustrated in Fig. 1, taken on the line 16—16 thereof;

Fig. 17 is a sectional view of a door and mounting means therefor, showing a modification of my invention;

Fig. 18 is a bottom view of the structure illustrated in Fig. 17, as viewed from the line 18—18 thereof;

Fig. 19 is a sectional view of the structure illustrated in Fig. 17, taken on the line 19—19 thereof, showing a further modification of my invention;

Fig. 20 is a perspective view of a sink and cabinet, similar to that illustrated in Fig. 1, showing a single drainboard construction;

Fig. 21 is a plan view of the structure illustrated in Fig. 20;

Fig. 22 is an enlarged sectional view of the structure illustrated in Fig. 21, taken on the line 22—22 thereof;

Fig. 23 is a broken sectional view of the structure illustrated in Fig. 20, taken on the line 23—23 thereof;

Fig. 24 is an enlarged broken view of a corner of the door showing the fastening means for the rubber bracket.

Fig. 25 is a view of structure similar to that illustrated in Fig. 17, showing a further form which my invention may assume;

Fig. 26 is a view of the right-hand rear inner corner of the cabinet illustrated in Fig. 20;

Fig. 27 is a broken view, with parts in section, of the upper left-hand side of the cabinet illustrated in Fig. 20;

Fig. 28 is an enlarged sectional view of the structure illustrated in Fig. 27, taken on the line 28—28 thereof; and Fig. 29 is a front elevational view of the structure illustrated in Fig. 17.

Figure 1:
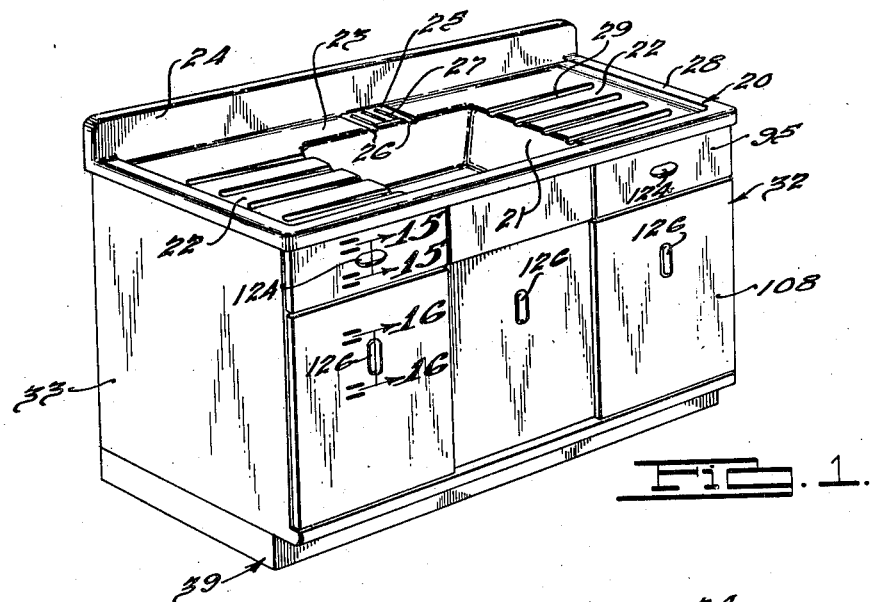
Figure 1 is a perspective view of a cabinet supporting a sink of the double drainboard type, embodying features of my invention.
Figure 2:
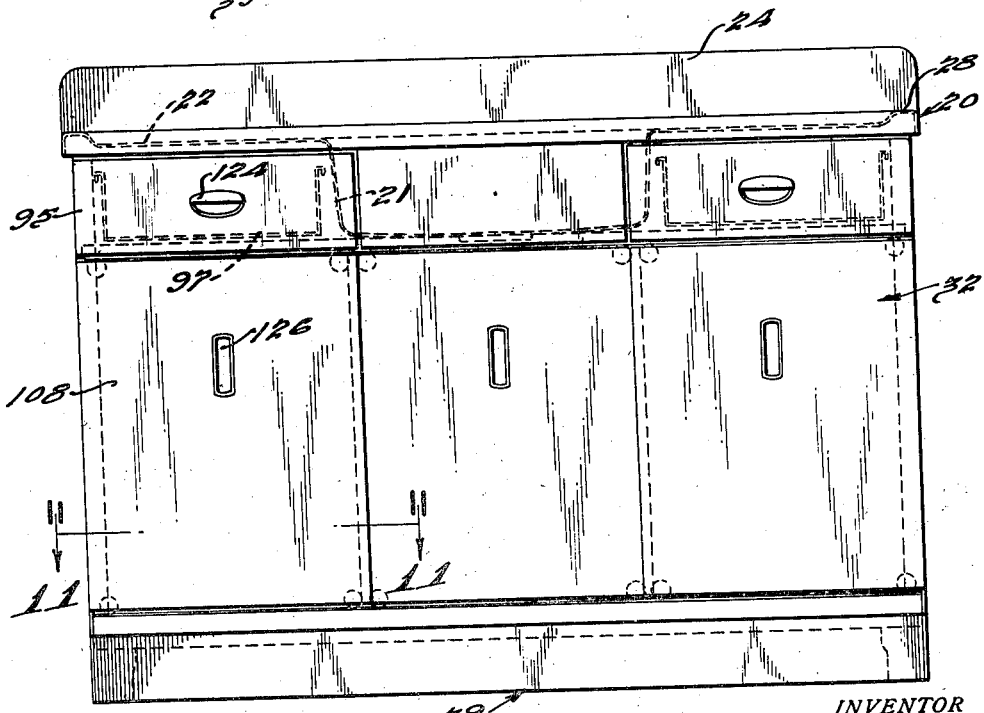
Fig. 2 is an enlarged front plan view of the structure illustrated in Fig. 1.

The sink 20 is preferably constructed from a single sheet of metal having a basin 21 formed downwardly between a pair of drainboards 22 disposed in a common plane with a ledge 23 provided between the basin and splashboard 24. The ledge 23 is debossed at 25 to form a soap dish which drains into the basin 21 through the drain openings 26. Ridges 27 may be embossed in the base of the soap dishes 25 to support the soap from the bottom of the dish. About the sides and the front of the drainboards and basin a rolled flange 28 forms a finished edge and a barrier against the flow of water outwardly thereover. The drainboard 22 and the ledge 23, being in a common plane, provide a flat support for dishes, pans and other utensils, from which the water drains into sloping channels 29 provided in the drainboard.

While I have illustrated a double drainboard type of sink in Fig. 1, in Fig. 20 a single drainboard type of sink is shown, which is similar in construction to that of the double drainboard sink above described. The usual drain openings 31 is provided in the central bottom of the basin 21 toward which the surface of the basin slopes. A cabinet 32 is formed of sheet metal stampings and is employed for supporting a sink.

The cabinet is constructed of end panels 33 flanged inwardly at 34 at the rear and at the front at 35. The panels 33 are provided with a flange 36 on the bottom, which rests upon a flange 37 of a channel shaped side wall 38 of a base 39. At the front, the base has an outwardly disposed flange 41 offset above the flange 37 at the side. The floor panel 42 for the cabinet rests upon the flange 41 and is welded or otherwise secured thereto. The panel projects forwardly of the base at 43 and is flanged downwardly at 44 and inwardly at 45 to provide a finished edge. The flange 35 at the front of the side panel 33 is flanged inwardly at 46, which flange is bent outwardly at the bottom at 47 to provide a tab by which the flange 46 may be welded to the floor panel 42.

The portion 48 of the side wall 33 below the flange 35 projects forwardly and is shaped to conform to the shape of the flanges 44 and 45 over which they project to provide a finished end therefor. A tab 49 on the projection 48 provides means whereby the flange 44 may be welded thereto. The floor panel 42 has a flange 51 at the rear edge which is flanged inwardly at 52 and interconnected and abutted against a back panel 54. Gusset plates 55 extend across the end portions of the back wall of the cabinet, connected across the corners of the base 39 on the inwardly directed flanges 56 thereof.

The storage compartment 57, enclosed by the side panels 33 and the rear panels 54, is a compartment which is divided by partitions 58 which are flanged outwardly at the bottom at 59 and welded or otherwise secured to the floor panel 42. At the front, the panels 58 are flanged outwardly at 61 and inwardly at 62 to form a finished edge, the flange 62 being flanged outwardly at the bottom at 63 to provide a welding tab. At the top the panel 58 is flanged outwardly at 64 to form a top finished edge below the drawers of the cabinet. The rear edge of the partition 58 mates with the inwardly extending flange 65 on the panel 54 and is welded thereto. The panel 54 is connected to the opposite side panel 33, or to the opposite panel 58 in a double drainboard sink cabinet, by an angular brace 66 having a top flange 67 which laps over and is welded or otherwise secured to the flange 68 on top of the panel 54.

As illustrated more particularly in Fig. 9, the panel or panels 54 have angle brackets 69 to which a guiding and supporting track 71, for a drawer, is welded or otherwise secured. The opposite end of the track is welded or otherwise secured to a flange 72 of a panel 73 disposed above the door openings of the cabinet. Angularly disposed braces 74 interconnect the top front cross bar 75 with the flange 68 of the rear panel 54.

The top edge of the side panels 76 of a drawer 77 is flanged outwardly at 78 and downwardly at 79 and extended within the channel portion 81 of the track 71. The channel portion 81 has the lower side leg 82, over which the flange 79 projects, extended upwardly at a material angle. The tracks 71 provide a rigid support for the drawers on the legs 82 while the legs 83, disposed adjacent thereto, prevents the drawers from tilting. The drawer is provided with a spring latch 84 on its one side, as illustrated in Figs. 27 and 28. The spring latch is formed of a strap of spring material secured to the side wall 76 of the drawer and extends outwardly in a position engageable with the side panel 73 at the door opening. Pressing inwardly on the end 85 of the spring latch 84 permits the latch to clear the panel 73 and the door may then be removed.

The opposite drawer supporting track 86 is illustrated in Figs. 7 and 8. The track is supported on the rear panel 54 by the angle bracket 69 to which the flanges are welded. The opposite end of the track 86 is secured to the flange 46 on the panel 33 by welding, or preferably, by bolts so that vertical adjustment may be made at one end of the track. The portion 87 of the flange 46 is bent outwardly and welded or otherwise secured to the front cross brace 75. The extending portion of the flange 45 is also welded to the end of the cross brace. Nuts 88 are welded to the top flange 89 on the side panel for the purpose of supporting studs 91 having the head enclosed in a rubber block 92. The bolts engage the underside of the rolled flange edge of the sink and provide an adjustabe support therefor.

An angle pillar brace 93 may be employed to reinforce the corner flanges 35 and 46 on the side panel 33, as illustrated in Fig. 27. As also illustrated in the figure, the front drawer panel 94 is of box section construction, being formed of an exterior panel 95 having inwardly flanged edges which mate with the inwardly flanged edges of an inner panel 96. The two side panels 76 and the bottom panel 97 of the drawers are formed of a unit sheet of metal, as illustrated more clearly in Fig. 22. The end panel 98 is preferably a separate panel secured to the bottom and side panels preferably by welding. A U-shaped stamping 99 may be disposed in the central part of the bottom panel 97 of the drawer to form compartments, as illustrated in Fig. 4.

In Figs. 5, 6, 7, and 10, I have illustrated the medial cross bar 101 as being of Z formation, the upwardly disposed leg 102 being flanged inwardly at 103 to form a ledge for the drawer, and downwardly at 104 to provide further strength to the ledge. The web portion 105 has a trackway 106 secured thereto, engageable by the rollers 107 on the doors 108 and 109. The trackway 106 is of channel shape, the leg portion forming the guides for the rollers, as illustrated more specifically in Fig. 14. The rollers are mounted on the flanges of a channel shaped member 111 which is secured by bolts 112 to the top flange 113 of the door. A spring 114 is mounted between a nut 115 and the web 116 of the member 111 to spring press the rollers to the trackways at the top of the door.

As illustrated in Fig. 12, a similar trackway 106 is mounted on the extending portion 43 of the floor panel 42 aligned with the trackway 106 on the cross bar 103 to be engaged by rollers 107 at the bottom of the door. The rollers 107 are supported on fixed brackets 118 and by lifting upwardly on the door, the bottom roller 107 may be moved from engagement with the track so that the door may be removed. Similarly the door may be inserted on the trackway by inserting the upper rollers 107 in their trackway and by raising the door upwardly the lower rollers may be inserted over their trackway. As illustated in Fig. 14, the adjacent doors are in different planes so that they are movable past each other.

In Fig. 15, I have illustrated an embossed recess 119 in the outer panel 95 of the drawer in which a stamping 121, having a portion 122 which mates with the lower half of the surface of the embossed portion, is maintained in fixed position by a rivet 123. An outer projecting portion 124 of the stamping 121 forms a hand-hold by which the drawer may be opened or closed. In Figs. 16 and 19, I have illustrated the door panel 108 as having a flanged recess 125 in which a dish-shaped stamping 126, having tangs 127 on the side, is secured. The tangs snap over the metal defining the edge of the opening and provide the locking engagement.

In Figs. 17 and 18, I have illustrated another form of construction for mounting the doors on the cabinet. In this arrangement the cross bar 103 is omitted and a cross brace is formed by a downwardly presented channel element 128 which supports a pair of trackways 129 rolled from a strip of sheet metal. Rollers 131 are attached to the doors by brackets 132 and are projected within the trackways at points 130, the openings in which are enlarged to receive the rollers. The flange 45 of the floor panel 42 has a guideway 133 bolted thereto. The guideway has a pair of downwardly projected channel portions 134 in which the headed ends 135 of supporting brackets 136 project to maintain the lower portion of the door inwardly. It will be noted in this construction that the floor panel 42 is flanged downwardly at 44 inwardly of the plane of the doors and that the doors project below the lower flange 45 to thereby eliminate the flange projection across the front bottom edge of the cabinet, as illustrated in Figs. 1 and 12. The brackets 136 are welded or otherwise secured to the bottom of the door 108, as illustrated in Fig. 18, with the headed ends formed by the embossed projections 137.

In Figs. 23 and 24, I have illustrated a further door construction, wherein the panels 108 and 109 are supported on rollers 107 at the top and bottom of the door with the ledge 44 disposed inwardly of the doors as in Fig. 17 of the drawings. The cross brace 138 is similar to the cross bar 129 with the exception that the trackways 139 are rolled from one flange of the channel strip forming the bar. The brackets 141 for supporting the rollers 107 are parallel to the wall of the door to eliminate any weakness which may be present when the brackets are offset. At the bottom, the floor panel 42 is provided with downwardly presented channel element 142 the legs of which form trackways for the rollers 107 mounted on brackets 143 which are secured between the overlapped flanges 144 and 149 of the door. The flanges 144 and 149 are provided with slots 145 and slots 146 are provided in the arms 147 of the brackets. Bolts 148 secure the arms 147 to the flange 144 and flange 149, as illustrated more clearly in Fig. 24. The door is first hung upon the trackways 139 on the upper rollers 107 and moved inwardly at the bottom to align the lower rollers with the trackway 142. The brackets 143 are moved upwardly until the rollers engage the legs on the trackway 142 after which the bolts 148 are tightened to retain the lower rollers 107 in snug engagement with the legs of the trackway.

In Fig. 20, a cabinet 151 is illustrated, constructed to support a single drainboard type of sink 152. The cabinet, besides being constructed to support a single drainboard sink, differs from the cabinet illustrated in Fig. 1 by having the projecting ledge below the doors eliminated. The ledge and trackways disposed frontwardly of the floor of the cabinet below the doors collected particles of dust, food, and the like, and provided an unsanitary condition. A greater recess is provided below the inwardly disposed door in front of the sink proper so that a person may stand closer to the sink than when a ledge is present below.

While I have described and illustrated several embodiments of my invention, it will be apparent to those skilled in the art that various changes, omissions, additions and substitutions may be made therein without departing from the spirit and scope of my invention, as set forth in the accompanying claims.

What I claim is:

1. In a cabinet construction, a sheet metal base member having flanged edges, side and rear panels having flanged edges mated with and welded to the flanges of the base and disposed in upward continuation of the base, a floor panel secured to said flanges and projecting forwardly of the entire front edge of the base, doors for the front of the cabinet extending forwardly of the marginal edge of said floor panel and the front edges of the side panels which are hidden thereby, and means for supporting said doors for opening movement on said cabinet.

2. In a cabinet construction, a sheet metal base member having flanged edges, side and rear panels having flanged edges mated with and welded to the flanges of the base and disposed in upward continuation of the base, a floor panel secured to said flanges and projecting forwardly of the front end of the base, doors for the front of the cabinet extending forwardly of the marginal edge of said floor panel which is hidden thereby, and trackways disposed in different planes for supporting said doors for lateral movement.

3. In a cabinet construction, a sheet metal base member having flanged edges, side and rear panels having flanged edges mated with and welded to the flanges of the base and disposed in upward continuation of the base, a floor panel secured to said flanges and projecting forwardly of the front end of the base, doors for the front of the cabinet extending forwardly of the marginal edge of said floor panel which is hidden thereby, trackways disposed in different planes for supporting said doors for lateral movement, similar trackways provided inwardly of the marginal front edge of the floor panel, and rollers at the top and bottom of said doors mated with said trackways to permit the doors to move in overlapping relation with each other.

4. In a cabinet, a floor panel terminating rearwardly of the front plane of the cabinet, a longitudinally extending brace disposed between the sides of the cabinet below the top thereof, a pair of trackways on said brace, a pair of trackways disposed on the underside of said floor panel rearwardly of the front edge thereof and out of the planes of the trackways on said brace, a pair of doors having rollers supported on the trackways on said brace and mounted to be movable in overlapping relation to each other, brackets on said doors, and rollers on said brackets engaging the trackways on the underside of the floor panel.

5. In a cabinet, a floor panel terminating rearwardly of the front plane of the cabinet, a longitudinally extending brace disposed between the sides of the cabinet below the top thereof, a pair of trackways on said brace, a pair of trackways disposed on the underside of said floor panel rearwardly of the front edge thereof and out of the planes of the trackways on said brace, a pair of doors having rollers supported on the trackways on said brace and mounted to be movable in overlapping relation to each other, brackets on said doors, and rollers on said brackets engaging the trackways on the underside of the floor panel, said doors and brackets being bolted together through a slot therein so that the door may be mounted or removed from the trackways.

6. The combination in a sheet metal cabinet, of a base formed of an upstanding sheet of metal flanged at both edges, side and rear panels having flanges mated with the flanges of the base frame and secured thereto, a floor panel secured to the flange of the side and rear panels, a transversely disposed partition joined to the rear panels and extending forwardly substantially to the plane through the front terminal ends of the side panels, doors extending over the front of the cabinet in overlapping relation with each other and the ends of the partition, side panels, and floor panel, and means for supporting said door panels for longitudinal movement across the front of said cabinet.

7. The combination in a sheet metal cabinet, of a base formed of an upstanding sheet of metal flanged at both edges, side and rear panels having flanges mated with the flanges of the base frame and secured thereto, a floor panel secured to the flange of the side and rear panels, a transversely disposed partition joined to the rear panel and extending forwardly substantially to the plane through the front terminal ends of the side panels, doors extending over the front of the cabinet in overlapping relation with each other and the ends of the partition, side panels, and floor panel, and means for supporting said door panels for longitudinal movement across the front of said cabinet, said doors each being formed from a sheet of metal flanged inwardly about its edges and the flanges being further flanged toward each other to form a box section construction.

8. In a cabinet construction, a base frame formed of a vertically extending sheet of metal, side panels extending upwardly from said base frame, rear panels spaced from each other medially of the cabinet and projecting upwardly from said base frame, a floor panel on said base frame projecting forwardly thereof, spaced partitions supported on said floor panel and secured to the inner edges of said rear panels forming three compartments, a longitudinally extending brace member having a pair of offset trackways thereon supported on the side panels below the top edge thereof, a door for each of said compartments extending forwardly of the floor panel and the two side panels, the central door being disposed inwardly of the two end doors for movement in overlapping relation therewith, and means for supporting said doors for longitudinal movement across the front of said cabinet.

9. In a cabinet construction, a base frame formed of a vertically extending sheet of metal, side panels extending upwardly from said base frame, rear panels spaced from each other medially of the cabinet and projecting upwardly from said base frame, a floor panel on said base frame projecting forwardly thereof, spaced partitions supported on said floor panel and secured to the inner edges of said rear panels forming three compartments, supported on the under side of said floor panel, a door for each of said compartments, the central door being disposed out of the plane of the two end doors for movement in overlapping relation therewith, additional trackways disposed above the floor panel, and rollers on said doors engaging the trackways under said floor panel and those thereabove for supporting the door frontwardly of the marginal edge of said floor panel.

10. In a cabinet construction, a base frame formed of a vertically extending sheet of metal, side panels extending upwardly from said base frame, rear panels spaced from each other medially of the cabinet and projecting upwardly from said base frame, a floor panel on said base frame projecting forwardly thereof, spaced partitions supported on said floor panel and secured to the inner edges of said rear panels forming three compartments, supported on the under side of said floor panel, a door for each of said compartments, the central door being disposed out of the plane of the two end doors for movement in overlapping relation therewith, additional trackways disposed above the floor panel, rollers on said doors engaging the trackways under said floor panel and those thereabove for supporting the door frontwardly of the marginal edge of said floor panel, and transverse brace members interconnecting the rear panel and the front panel at drawer openings therein for strengthening the panel and providing a support for drawers.

ALFRED H. HABERSTUMP.